US012627979B2

(12) United States Patent
Ikuno

(10) Patent No.: US 12,627,979 B2
(45) Date of Patent: May 12, 2026

(54) METHOD FOR LICENSE-BASED ACCESS NETWORK ACCESS CONTROL INDEPENDENT OF SUBSCRIBER DATA IN A TELECOMMUNICATIONS NETWORK AND TELECOMMUNICATIONS NETWORK THEREOF

(71) Applicant: Deutsche Telekom AG, Bonn (DE)

(72) Inventor: Josep Colom Ikuno, Korneuburg (AT)

(73) Assignee: DEUTSCHE TELEKOM AG, Bonn (DE)

( * ) Notice: Subject to any disclaimer, the term of this patent is extended or adjusted under 35 U.S.C. 154(b) by 423 days.

(21) Appl. No.: 17/713,250

(22) Filed: Apr. 5, 2022

(65) Prior Publication Data

US 2022/0322093 A1      Oct. 6, 2022

(30) Foreign Application Priority Data

Apr. 6, 2021    (EP) ..................................... 21166923

(51) Int. Cl.
*H04W 12/08* (2021.01)
*H04W 12/72* (2021.01)

(52) U.S. Cl.
CPC ........... *H04W 12/08* (2013.01); *H04W 12/72* (2021.01)

(58) Field of Classification Search
CPC ..... H04W 12/00; H04W 12/06; H04W 12/08; H04W 12/40; H04W 12/72; G06F 21/57; G06F 21/51; G06F 21/575; G06F 21/10; H04L 63/10; H04L 63/12; H04L 63/08; H04L 63/0823
See application file for complete search history.

(56) References Cited

U.S. PATENT DOCUMENTS

| | | |
|---|---|---|
| 2013/0275973 A1 | 10/2013 | Greenfield et al. |
| 2014/0086177 A1* | 3/2014 | Adjakple .............. H04W 74/04 |
| | | 370/329 |
| 2019/0082376 A1 | 3/2019 | Hong et al. |
| 2019/0205505 A1* | 7/2019 | Kim ...................... H04L 63/107 |
| 2019/0335532 A1 | 10/2019 | Kim et al. |
| 2019/0357119 A1 | 11/2019 | Hong et al. |
| 2020/0359212 A1* | 11/2020 | Chen ..................... H04L 63/102 |
| 2020/0367054 A1* | 11/2020 | Obaidi .................. H04L 9/0643 |
| 2021/0392605 A1* | 12/2021 | Park ................... H04W 60/005 |
| 2022/0132310 A1* | 4/2022 | Tsuoka ................... H04W 8/20 |

FOREIGN PATENT DOCUMENTS

WO      2019029883 A1    2/2019

* cited by examiner

*Primary Examiner* — Syed M Ahsan
*Assistant Examiner* — Sayeda Salma Nahar
(74) *Attorney, Agent, or Firm* — Leydig, Voit & Mayer, Ltd.

(57) ABSTRACT

A method for license-based Access Network (AN) access control independent of subscriber data in a telecommunications network includes: sending, by a user equipment (UE) to an AN, an AN resource request to use one or more AN resources; obtaining, by the AN from an AN license validator, validity information, the validity information indicating whether at least one AN license information element or at least one AN license derived information element is valid for an AN resource to which the UE is trying to attach; and based on an AN license information element or an AN license derived information element being valid for the AN resource to which the UE is trying to attach, allowing, by the AN, the UE to access the requested AN resource.

20 Claims, 6 Drawing Sheets

METHOD FOR LICENSE-BASED ACCESS NETWORK ACCESS CONTROL INDEPENDENT OF SUBSCRIBER DATA IN A TELECOMMUNICATIONS NETWORK AND TELECOMMUNICATIONS NETWORK THEREOF

CROSS-REFERENCE TO PRIOR APPLICATIONS

This application claims benefit to European Patent Application No. EP 21 166 923.9, filed on Apr. 6, 2021, which is hereby incorporated by reference herein.

FIELD

This invention relates to a method for license-based Access Network (AN) access control independent of subscriber data in a telecommunications network and a telecommunications network thereof.

BACKGROUND

The use of frequencies for non-operator use (e.g. in Germany were introduced in the 3.7 GHz to 3.8 GHz frequency range) allow the deployment of mobile networks for non-operator use. In recent years, the trend seems to go towards a more flexible use of frequency blocks compared to the traditional model where only a few operators own all of the spectrum usage rights.

Additionally, most operators also setup their physical infrastructure in "TowerCos", which manage the physical infrastructure of the radio sites. However, currently the radio equipment (i.e. the base stations) is owned and managed by the telecommunications operator.

Within the telecommunications operator, the trend emerges of introducing a separation between the Radio Access Network (RAN) and the rest of the telecommunications operator. The RAN part, out of this separation, will be referred to as RAN operator (RANO), which would have access to physical sites, RAN equipment and use and/or own frequency license(s) allowing them to use certain parts of the spectrum within some frame (e.g. constrained to a specific time frame/geographic area).

While the following description of the background and the invention often assumes a Radio Access Network, the same principles are applicable to Access Networks (ANs) using access mediums other than radio.

On the other side of the above-mentioned separation, Network Operators (NOs) then offer connectivity services to customers by using the services of RANOs. NOs, analogously to current operators, are assumed to know who each customer is and what has each customer contracted (e.g. speed, level of service, etc.).

FIG. 1 illustrates an example of how current mobile telecommunications systems are functionally split (exemplified for the case of a 5G system (5GS)). A User Equipment (UE) 1 is connected to a Data Network (DN) 4 via a Core Network (CN) 3 and an Access Network (AN) 2.

Whether the UE 1 is allowed to access the AN 2 and/or the DN 4 is decided by the CN 3 based on the subscription data 30 in the given UE 1. The subscription data 30 is tied to a given subscriber, which e.g. is charged different amounts for access to different services.

The Access Node (ANs) 2 referred to in the following specification may be Radio Access Networks (RANs), which are the ANs that are based on radio technologies (e.g. 5G New Radio, 5G NR).

Both the RAN 2 and the CN 3 are composed of several functional components. In the case of 5G, the RAN 2 is composed of gNBs and the CN 3 of Network Functions (NFs). This is exemplarily illustrated in FIG. 2.

FIG. 2 illustrates an example of a RAN and CN decomposition. FIG. 2 illustrates the several relevant interfaces between the following components as named within a 5G system: gNB-gNB: Xn interface; UE-gNB: Uu interface; and gNB-NF: NG interface. As shown in FIG. 2, the CN 3 is composed of NFs which are connected to the gNBs of the RAN 2 through NG interfaces. The gNBs are also interconnected between them through the Xn interfaces. Finally, the UEs 1 are connected to the gNBs through Uu interfaces.

In order for a UE to attach (i.e. connect) to a 5G network, 3GPP Technical Specification (TS) 23.501 specifies the following procedure (shown in FIG. 3).

FIG. 3 illustrates a simplified overview of the UE attach procedure. In FIG. 3, the following steps are performed.

In step S1, the UE 1 sends a registration request to the RAN 2.

In step S2, the RAN, based on the parameters included in the request or other known parameters (e.g. OAM, local configuration) selects an Access and Mobility Management Function (AMF) and forwards, in step S3, the request to a NF tasked with access control (e.g. AMF in the case of a 5GS).

In step S4, the Access AMF, performs an authentication/security check with a subscriber NF.

In step S5, the Access AMF gets subscriber information from the subscriber NF.

In steps S6 and S7, based on the obtained subscriber information accessible via the subscriber NF (e.g. UDM in 5GS), the Access AMF accepts, rejects or redirects the registration request by forwarding a registration response to the UE 1 through the RAN 2.

Finally, in step S8, the UE 1 is registered in the CN 3.

In the current state of the art the RAN is not configured to perform any kind of credential-based access control. Typically, a telecom regulator, which is referred to in this specification as a Frequency Owner (FO) awards each network operator (NO) what frequencies each NO is allowed to operate, e.g. via a frequency auction or other method.

FIG. 4 illustrates a simplified overview of the mechanism of frequency award according to the state of the art. In FIG. 4, the FO awards a frequency license to a telecom operator. The telecom operator then configures its RAN, typically via the RAN's (Operations, Administration and Maintenance) OAM system to use the assigned frequencies. Finally, the RAN configuration gets pushed to the RAN nodes 2.

The operator is responsible for assigning the frequencies according to the awarded frequency license. This may include the following parameters: Frequency range (e.g. 3.7-3.8 GHz); Maximum power (e.g. 20 dBm); Frequency use (e.g. private/public use); Geographic area (e.g. whole country, specific geographic region); Frequency lease time (e.g. 20 years) and/or any regulatory requirements (e.g. Legal Interception).

SUMMARY

In an exemplary embodiment, the present invention provides a method for license-based Access Network (AN) access control independent of subscriber data in a telecommunications network. The method includes: sending, by a user equipment (UE) to an AN, an AN resource request to use one or more AN resources, wherein the AN resource request comprises one or more AN license information elements, or wherein the AN resource request is followed by an exchange between the UE and the AN of one or more AN license derived information elements analogous for validation purposes to sending the one or more AN license information elements without the one or more AN license information elements actually being transmitted; obtaining, by the AN from an AN license validator, validity information of the one or more AN license information elements or the one or more AN license derived information elements, the validity information indicating whether at least one AN license information element or at least one AN license derived information element is valid for an AN resource to which the UE is trying to attach; and based on an AN license information element or an AN license derived information element being valid for the AN resource to which the UE is trying to attach, allowing, by the AN, the UE to access the requested AN resource.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figures 1, 2:
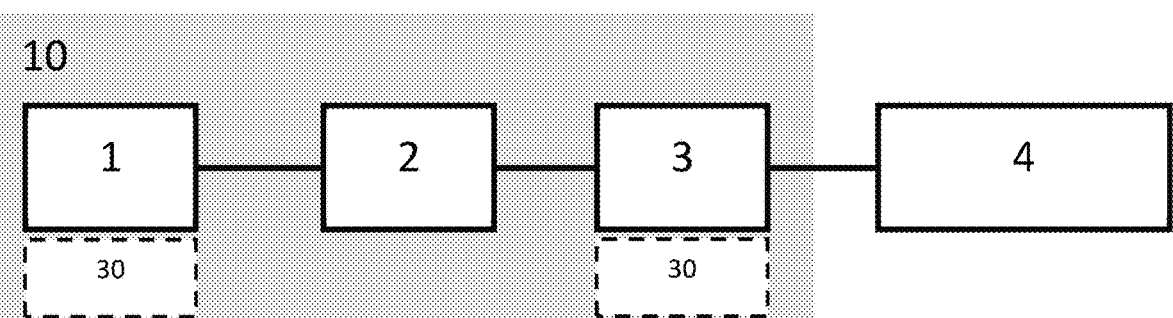
FIG. 1 illustrates an example of how a 5G system (5GS) is functionally split.
FIG. 2 illustrates an example of AN and CN decomposition.
Figure 3:
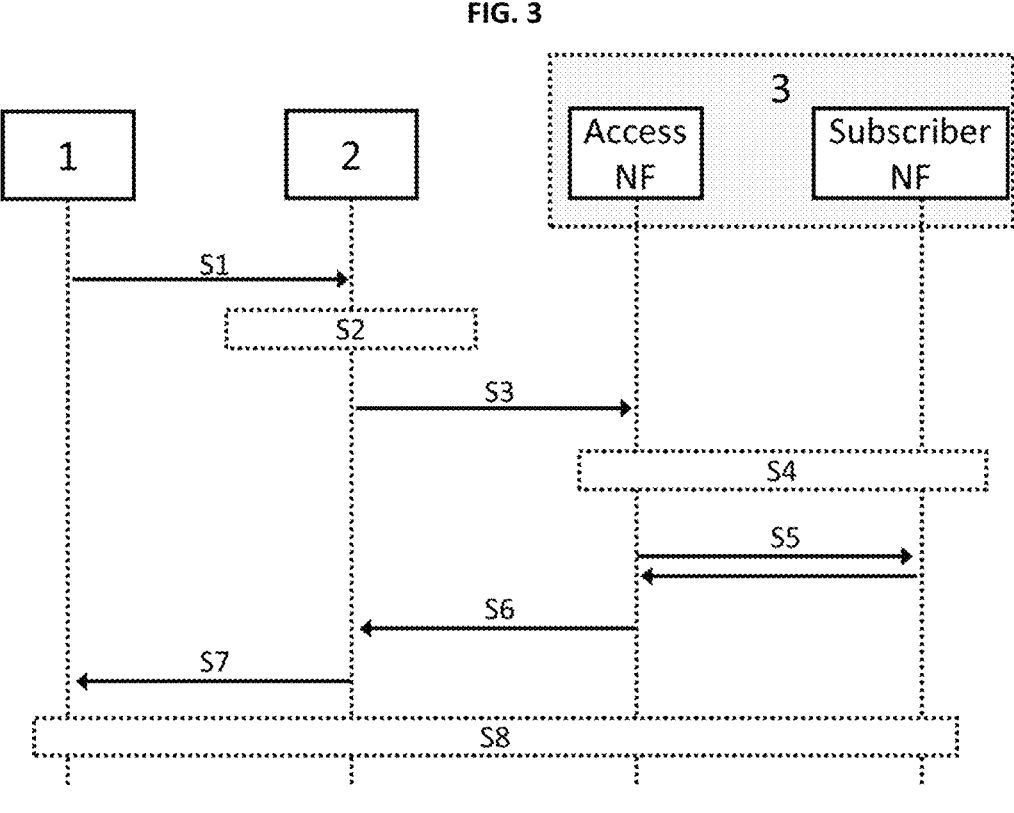
FIG. 3 illustrates a simplified overview of a UE attach procedure.
Figure 4:
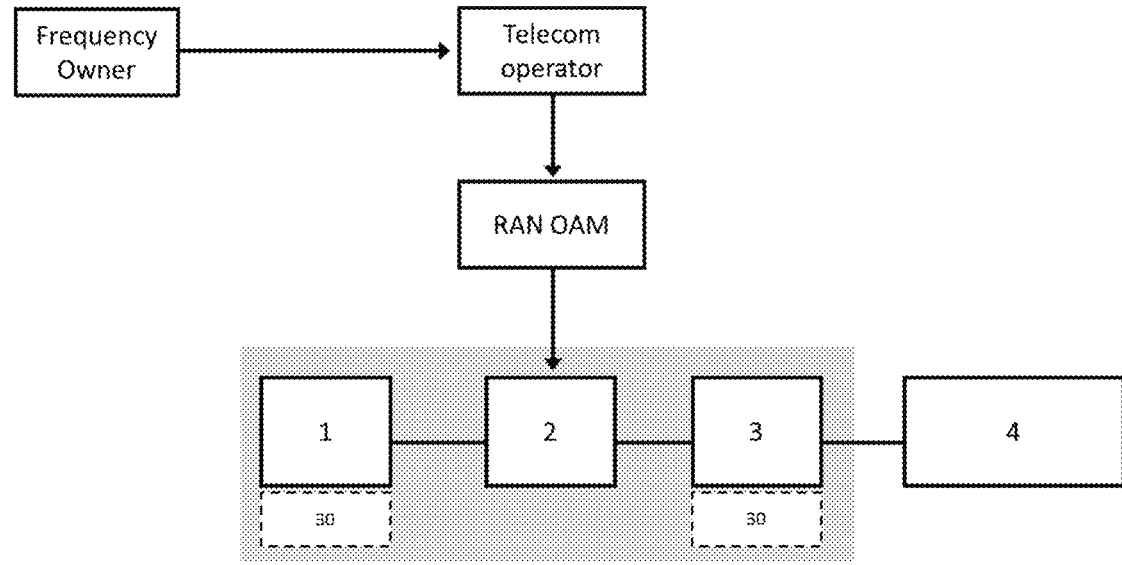
FIG. 4 illustrates a simplified overview of a mechanism of frequency award according to the state of the art.

Currently, RANOs do not have any mechanism to ascertain whether a given UE should be granted access to use specific RAN resources unless they have access to sub-scriber information. At the same time, NOs are assumed to ensure that RANOs do not have access to the subscriber data owned by the NOs.

In view of the above, exemplary embodiments of the present invention provide a method for license-based AN access control independent of subscriber data in a telecommunications network and a telecommunications network thereof.

According to an aspect of the invention, there is provided a method for license-based Access Network (AN) access control independent of subscriber data in a telecommunications network, the telecommunications network comprising: a User Equipment (UE); an AN, comprising AN resources; an AN license validator; and a Core Network (CN), wherein the UE comprises subscriber information associated with a subscriber and one or more AN license information elements, wherein AN license information elements contain information allowing access to one or more AN resources independently from subscriber information. The method comprises the steps of: sending, by the UE to the AN, an AN resource request to use one or more AN resources, wherein the AN resource request comprises one or more AN license information elements, receiving, by the AN from the UE, one or more AN license information elements comprised in the AN resource request of the UE, or sending, by the UE to the AN, an AN resource request to use one or more AN resources, followed by an exchange between the UE and the AN of one or more AN license derived information elements analogous for validation purposes to sending the one or more AN license information elements itself without the actual AN license information elements being directly transmitted;

obtaining, by the AN from the AN license validator, validity information of the one or more AN license information elements or one or more AN license derived information elements, the validity information indicating whether at least one AN license information element or at least one AN license derived information element is valid for the AN resource to which the UE is trying to attach; and if an AN license information element or an AN license derived information element is valid for the AN resource to which the UE is trying to attach: allowing, by the AN, the UE access to the requested AN resource.

According to another aspect of the invention, there is provided a method for license-based AN access control independent of subscriber data in a telecommunications network, the telecommunications network comprising: a UE; an AN, comprising AN resources; an AN license validator; and a CN, wherein the UE comprises subscriber information associated with a subscriber and the CN comprises one or more AN license information element, wherein AN license information elements contain information allowing access to one or more AN resources independently from subscriber information. The method comprises the steps of: sending, by the UE to the AN, an AN resource request to use one or more AN resources; requesting, by the AN to the CN, to: send one or more AN license information elements related to the AN resource request of the UE, receiving, by the AN from the CN, one or more AN license information elements related to the AN resource request of the UE, or initiate an exchange of one or more AN license derived information elements analogous for validation purposes to sending the one or more AN license information elements itself without the actual AN license information elements being directly transmitted; obtaining, by the AN from the AN license validator, validity information of the one or more AN license information elements or one or more AN license derived information elements, the validity information indicating whether at least one AN license information element or at least one AN license derived information element is valid for the AN resource to which the UE is trying to attach; and if an AN license information element or an AN license derived information element is valid for the AN resource to which the UE is trying to attach: allowing, by the AN, the UE access to the requested AN resource.

According to a preferred aspect, the telecommunications network further comprises an AN license provider and the method further comprises the steps of: receiving, by the CN from the AN license provider, one or more AN license information elements or one or more AN license derived information elements; provisioning, by the CN to the UE, one or more AN license information elements or one or more AN license derived information elements; and/or revoking, by the CN, one or more AN licenses, wherein revoking comprises notifying the UE or the AN that one or more AN license information elements or one or more AN license derived information elements are not valid anymore and/or indicating the UE said licenses for deletion.

According to a preferred aspect, the method further comprises: storing, by the UE, one or more AN license information elements or one or more AN license derived information elements in a Universal Subscriber Identity Module, USIM, element.

According to a preferred aspect, the telecommunications network further comprises an AN license provider and the method further comprises the steps of: receiving, by the CN from the AN license provider, one or more AN license information elements or one or more AN license derived information elements; revoking, by the CN, one or more AN licenses, wherein revoking comprises marking that one or more AN license information elements or one or more AN license derived information elements are not valid anymore and/or deleting said AN license.

According to a preferred aspect, the AN resource request is a UE network registration to a specific Public Land Mobile Network (PLMN), and optionally a slice identifier.

According to a preferred aspect, the AN refers to a Radio Access Network (RAN), composed of RAN nodes, and the AN resource comprises one or more of the following: a specific RAN node or RAN nodes, cell Identities (IDs), or Tracking Area; PLMN identifier; slice identifier; specific locations, geographic area; specific frequencies and/or an expiry timer for indicating a time duration for which the AN license information element or one or more AN license derived information elements is valid.

According to a preferred aspect, the telecommunications network further comprises a third-party entity.

According to a preferred aspect, the AN license validator is located in the third-party entity or in the AN.

According to a preferred aspect, the telecommunications network further comprises a first Network Operator (NO), and a second NO, the first NO having a valid AN license information element or a valid AN license derived information element stored therein. The method further comprises: exchanging ownership of said AN license information element or AN license derived information element to the second NO by: registering said ownership change with the third-party entity, revoking, by the third-party entity, the validity of the AN license information element or AN license derived information element of the first NO, provisioning an AN license information element or AN license derived information element to the second NO allowing access to the same AN resources as the AN license information element or AN license derived information element originally owned by the first NO.

According to a preferred aspect, the AN license validator entity is a Distributed Ledger (DL), comprising AN resources ownership information stored therein and the method comprises the step of: providing, by the DL to the UE, AN and/or CN, validated AN resources ownership information upon request.

According to a preferred aspect, when the AN license is not valid and the UE is denied access, the method further comprising: notifying, by the AN or the CN to the UE that the access has been denied by the AN.

According to another aspect of the invention, there is provided a telecommunications network configured to perform license-based AN access control independent of subscriber data, the telecommunications network comprising: a UE; an AN, comprising AN resources; an AN license validator; and a CN, wherein the UE comprises subscriber information associated with a subscriber and one or more AN license information elements, wherein AN license information elements contain information allowing access to one or more AN resources independently from subscriber information, wherein: the UE is configured to: send, to the AN, an AN resource request to use one or more AN resources, wherein the AN resource request comprises one or more AN license information elements, and the AN is configured to receive, from the UE, one or more AN license information elements comprised in the AN resource request of the UE, or send, to the AN, an AN resource request to use one or more AN resources, followed by an exchange between the UE and the AN of one or more AN license derived information elements analogous for validation purposes to sending the one or more AN license information elements itself without the actual AN license information elements being directly transmitted; the AN is configured to obtain from the AN license validator, validity information of the one or more AN license information elements or one or more AN license derived information elements, the validity information indicating whether at least one AN license information element or at least one AN license derived information element is valid for the AN resource to which the UE is trying to attach; and if an AN license information element or an AN license derived information element is valid for the AN resource to which the UE is trying to attach: the AN is configured to allow the UE access to the requested AN resource.

According to another aspect of the invention, there is provided a telecommunications network configured to perform license-based AN access control independent of subscriber data, the telecommunications network comprising: a UE; an AN, comprising AN resources; an AN license validator; and a CN, wherein the UE comprises subscriber information associated with a subscriber and the CN comprises one or more AN license information element, wherein AN license information elements contain information allowing access to one or more AN resources independently from subscriber information; wherein: the UE is configured to send, to the AN, an AN resource request to use one or more AN resources; the AN is configured to request, to the CN, to: send one or more AN license information elements related to the AN resource request of the UE, and receive, from the CN, one or more AN license information elements related to the AN resource request of the UE, or initiate an exchange of one or more AN license derived information elements analogous for validation purposes to sending the one or more AN license information elements itself without the actual AN license information elements being directly transmitted; the AN is configured to obtain from the AN license validator, validity information of the one or more AN license information elements or one or more AN license derived information elements, the validity information indicating whether at least one AN license information element or at least one AN license derived information element is valid for the AN resource to which the UE is trying to attach; and if an AN license information element or an AN license derived information element is valid for the AN resource to which the UE is trying to attach: the AN is configured to allow the UE access to the requested AN resource.

Other aspects, features, and advantages will be apparent from the summary above, as well as from the description that follows, including the figures and the claims.

Figure 5:
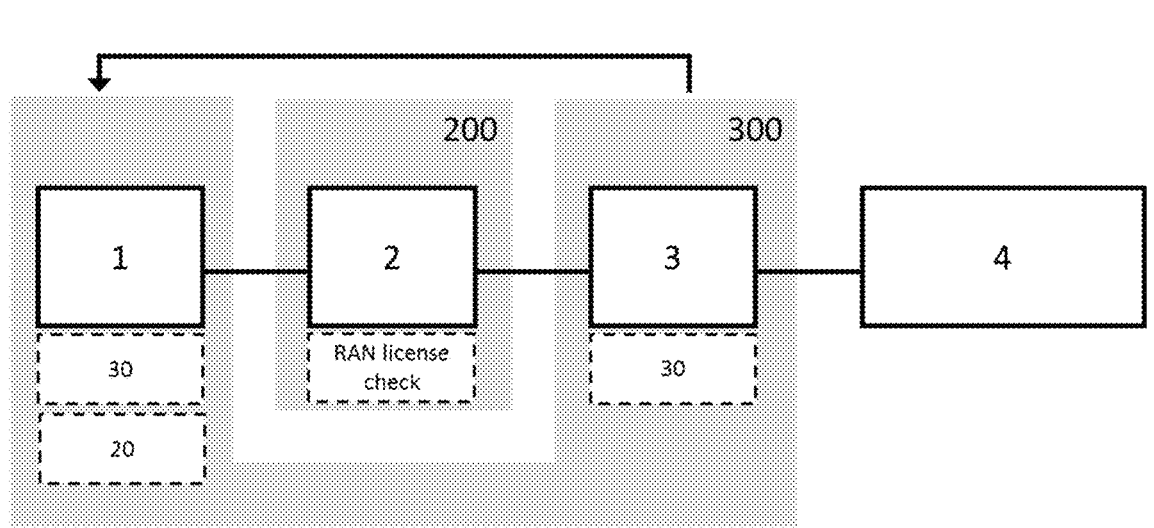
FIG. 5 illustrates a telecommunications network comprising AN license information according to an embodiment of the invention.

According to an embodiment of the present invention, there is provided a telecommunications network comprising RAN license information as illustrated by FIG. 5. The telecommunications network of FIG. 5 comprises a User Equipment 1, UE; an Access Network 2, AN, comprising AN resources; an AN license validator; and a Core Network 3, CN, wherein the UE 1 comprises subscriber information 30 associated with a subscriber, wherein RAN license information elements 20 contain information allowing access to one or more RAN resources independently from subscriber information 30.

In order to allow a given UE 1 access to a specific AN resource (e.g. a RAN network, specific cell, specific frequency within a RAN network), the Network Operator (NO) stores one or more AN license information elements 20 in the UE 1 or the CN 3.

In a preferred embodiment, the AN licenses are stored in the UE 1 (see FIG. 5). Alternatively, the RAN licenses may be stored in the CN 3 (see FIG. 8 which will be described later).

According to the embodiment of FIG. 5, the UE 1 contains not only subscription data 30 used for allowing access to the NO but also AN license information element(s) 20 allowing access to resources in one or more RAN Operators (RANOs).

Figure 6:
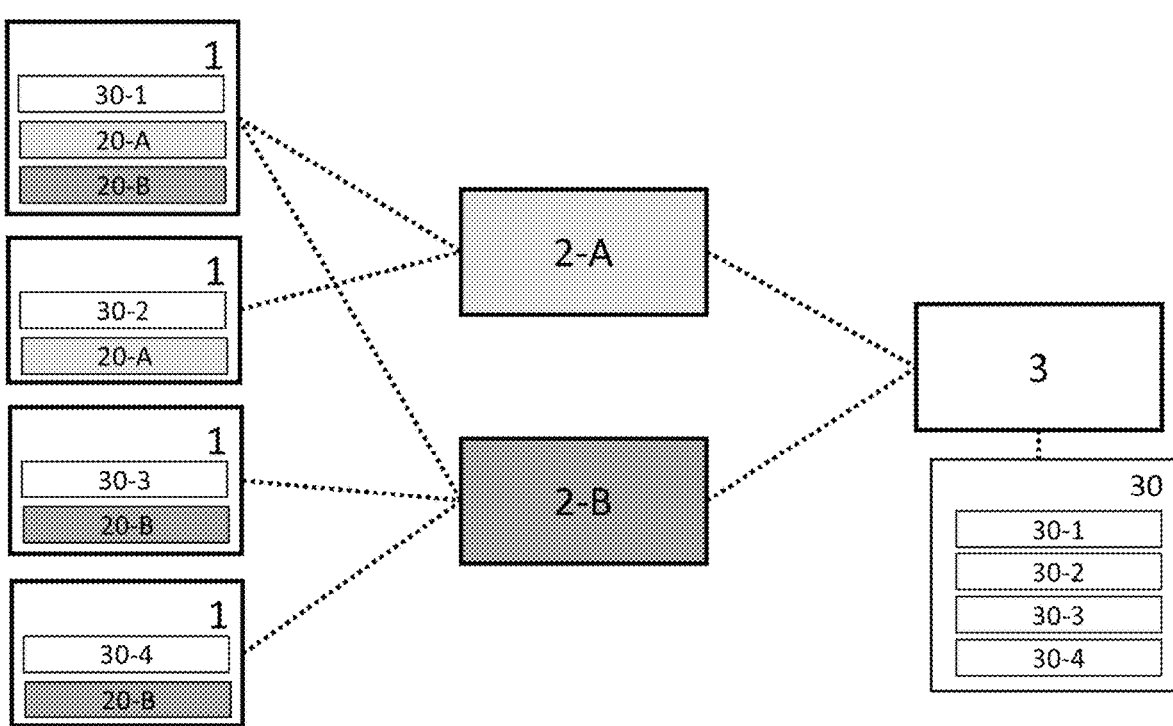
FIG. 6 illustrates an example deployment of AN licenses on several UEs allowing access to specific RAN resources according to an embodiment of the invention.

FIG. 6 illustrates an example where AN licenses 20-A and 20-B are deployed on several UEs allowing access to specific AN resources 2-A and 2-B. In FIG. 6, each subscriber has (as it is now) unique subscriber information 30-1, 30-2, 30-3, 30-4 (e.g. IMSI and associated keys stored in a USIM element) which the NO can validate.

The NO possesses "AN license A" 20-A and "AN license B" 20-B, which can be used to offer access to AN A and/or RAN B. The NO may store one or more AN licenses on each UE (e.g. maybe UE 1 has a subscription contract allowing access to more networks compared to another UE 1). As a result: UE 1 can access the NO's services via AN A or AN B; the second UE 1 can access the NO's services via B; and so on.

The AN license information elements 20-A, 20-B allow the RANO to verify whether a given UE has access to the given resource 2-A, 2-B (the AN license information element 20-A, 20-B can be considered a "license file"). The RANO does not require any subscription data. As such, the NO can grant UEs 1 access to specific AN resources 2-A, 2-B without giving RANOs information regarding the subscribers themselves.

As such, the AN performs access control based on AN license information and the CN 3 performs access control based on subscriber data.

Figure 7:
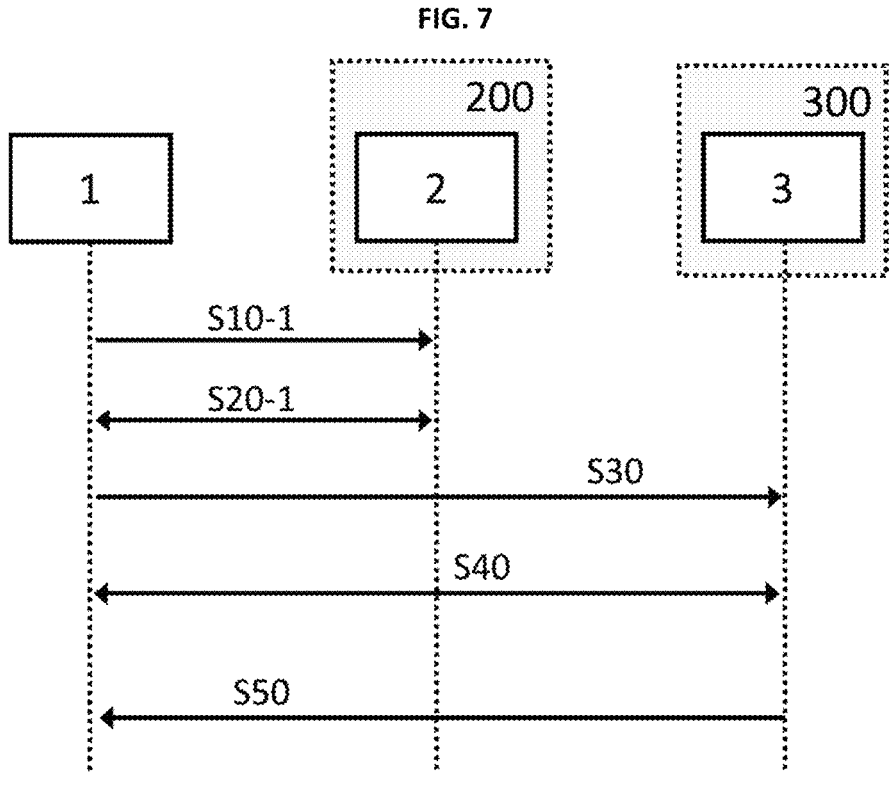
FIG. 7 illustrates a flowchart of a method for license-based AN access control independent of subscriber data according to an embodiment of the invention.

FIG. 7 illustrates a flowchart of a method for license-based AN access control independent of subscriber data according to an embodiment of the invention, which will be described in detail as follows.

In step S10-1 the UE 1 sends to the AN an AN resource request to use one or more AN resources. The AN resource request comprises one or more AN license information elements. The AN then receives the one or more AN license information elements as comprised in the AN resource request of the UE 1.

Alternatively, the UE 1 sends to the AN, an AN resource request to use one or more AN resources 2-A, 2-B followed by an exchange of one or more AN license derived information elements analogous for validation purposes to sending the one or more AN license information elements itself without the actual AN license information elements being directly transmitted. This exchange could be done by cryptographical means, allowing for validation without direct transmission of AN license information elements (licenses, keys and similar sensitive information are only rarely directly transmitted).

An exchange of AN license derived information elements may involve a series of messages including AN license derived information elements between UE 1 and AN.

Once the AN has received this information, in step S20, the AN obtains, from the AN license validator, validity information of the one or more AN license information elements or one or more AN license derived information elements. The validity information indicates whether at least one AN license information element or at least one AN license derived information element is valid for the AN resource to which the UE is trying to attach.

If an AN license information element or an AN license derived information element is valid for the AN resource to which the UE is trying to attach, the AN allows, in step S30, the UE 1 access to the requested AN resource. This means that the UE 1 can now send a registration request to the CN 3 and can negotiate network access with the CN 3 based on its subscriber credentials.

Preferably, in step S40, the CN 3 authenticates and performs any necessary security check with the subscription data, i.e. credentials, provided by the UE 1.

Preferably, in step S50, the CN 3 sends a registration response to the UE 1.

In a preferred embodiment, a similar procedure to the one described above can be performed in the case of mobility, i.e. when a UE is moving between cells. In other words, the AN license information may be taken into account for mobility procedures.

For example, if a UE 1 has an AN license for frequency X, the UE 1 can validly get registered/access the network on frequency X on cell A by using any of the above described methods. In addition, the same UE 1 can then perform a handover to cell B on the same frequency X by using the AN license information in the handover request. However, if the UE 1 attempts to do a handover to cell C on frequency Y, UE 1 will not be allowed to do so because it does not have a valid AN license for frequency Y.

Figure 8:
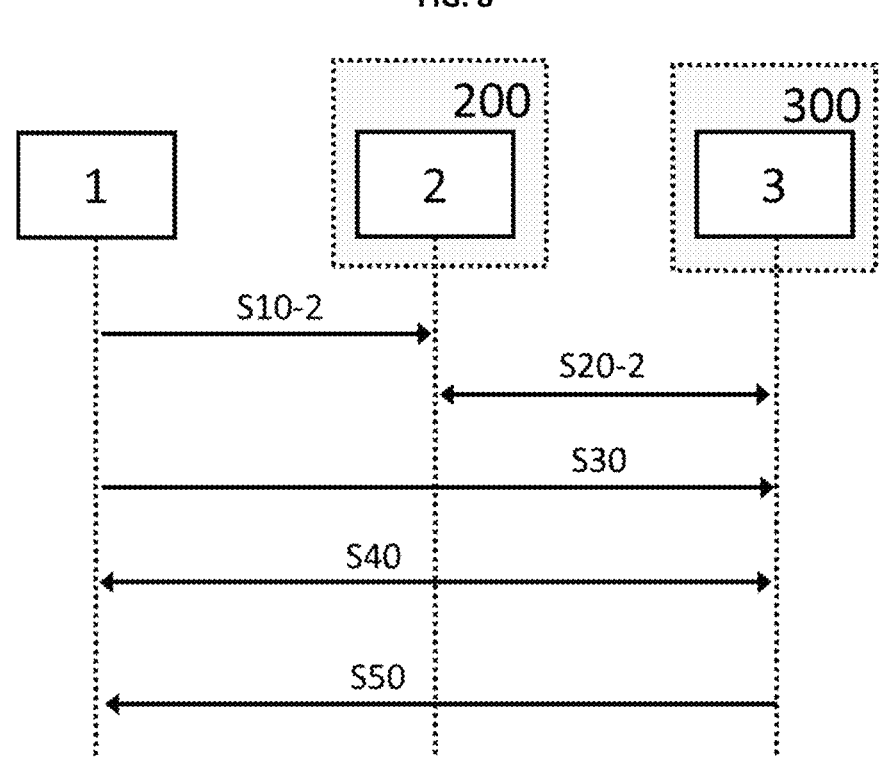
FIG. 8 illustrates a flowchart of a method for license-based AN access control independent of subscriber data according to an embodiment of the invention.

According to another embodiment of the invention, there is provided a method for license-based AN access control independent of subscriber data in a telecommunications network. This embodiment differs from the previous embodiment in that the CN 3 is the one that comprises one or more AN license information elements. In other words, in this alternative the UE 1 is completely unaware of, i.e. it does not perceive anything relating to, the AN license information elements or any processing steps relating to the AN license information elements. FIG. 8 illustrates a flow chart of a method for license-based AN access control independent of subscriber data describing according to this embodiment.

In step S10-1, the UE 1 sends to the AN an AN resource request to use one or more AN resources. However, as mentioned before, said resource request does not include any AN license information elements.

For this reason, the AN 2 has to request to the CN 3, to send one or more AN license information elements related to the AN resource request of the UE 1.

Alternatively, the AN 2 may request the CN 3 to initiate an exchange of one or more AN license derived information elements analogous for validation purposes to sending the one or more AN license information elements itself without the actual AN license information elements being directly transmitted. This exchange could be done by cryptographical means, allowing for validation without direct transmission of AN license information elements (licenses, keys and similar sensitive information is only rarely directly transmitted).

The AN 2 then receives from the CN 3 one or more AN license information elements or one or more AN license derived information elements related to the AN resource request of the UE 1.

An exchange of AN license derived information elements may involve a series of messages including AN license derived information elements between AN 2 and CN 3.

In step S20-2, the AN obtains from the AN license validator, validity information of the one or more AN license information elements or the one or more AN license derived information elements. The validity information indicates whether at least one AN license information element or at least one AN license derived information element is valid for the AN resource to which the UE 1 is trying to attach.

In step S30, if an AN license information element or an AN license derived information element is valid for the AN resource to which the UE 1 is trying to attach, the AN allows the UE 1 to access the requested AN resource.

Preferred steps S40 and S50 are the same as the ones described above for FIG. 7.

In a preferred embodiment, the AN resource request may be a UE network registration to a specific Public Land Mobile Network (PLMN) and optionally a slice identifier.

In a preferred embodiment, the AN resource may comprise one or more of the following: a specific AN node or AN nodes, cell Identities (IDs), or Tracking Area; PLMN identifier; slice identifier; specific locations, geographic area; specific frequencies and/or an expiry timer for indicating a time duration for which the AN license information element is valid.

In a preferred embodiment, the telecommunications network may further comprise an AN license provider. In this case, the method of FIG. 7 or 8 can further comprise the following additional steps.

The CN 3 may receive from the AN license provider, one or more AN license information elements or one or more AN license derived information elements. This information allows the CN 3 to be able to provision to the UE 1 or the RAN 2, one or more AN license information elements 20-A, 20-B or one or more AN license derived information elements.

Further, the CN 3 may revoke one or more AN licenses by notifying the UE 1 or the AN 2 that one or more AN license information elements or one or more AN license derived information elements are not valid anymore.

In a preferred embodiment, the telecommunications network may further comprise a third-party entity 50.

In a preferred embodiment, the AN license validator may be located in the third-party entity 50 or in the AN 2.

Figure 9:
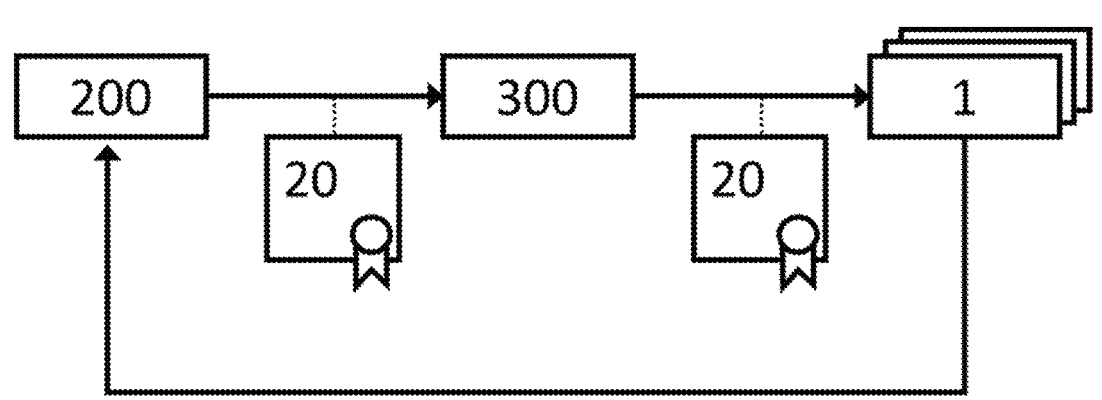
FIG. 9 illustrates an example case when a RANO can validate AN license information elements or AN license derived information elements by itself according to an embodiment of the invention.
Figure 10:
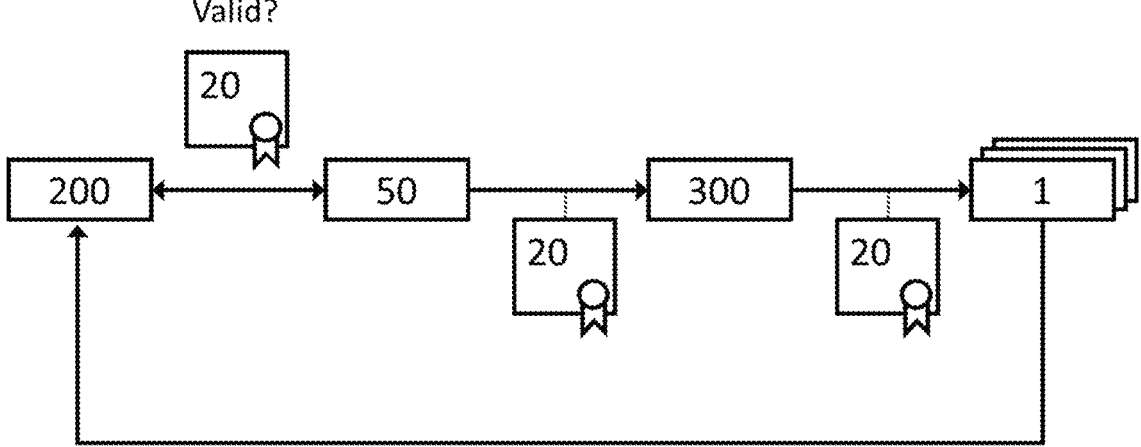
FIG. 10 illustrates an example case when a RANO cannot validate AN license information elements or AN license derived information elements by itself and requires a third-party entity for AN license validation according to an embodiment of the invention.

The location of the AN license validator gives raise to two different scenarios which are illustrated by FIGS. 9 and 10.

FIG. 9 illustrates an example case when a RANO can validate AN license information elements or AN license derived information elements by itself, whereas FIG. 10 illustrates an example case when a RANO cannot validate AN license information elements or AN license derived information elements by itself and requires a third-party entity for AN license validation (e.g. check with regulator entity whether the AN license is valid).

According to FIG. 10, a RANO 200 can provide AN licenses 20 for resources it owns (e.g. it owns a certain frequency) to the NOs 300. The NO 300 can then forward/provide the AN licenses to the UE 1.

According to FIG. 10, the AN license information elements or AN license derived information elements are produced by a third-party entity 50, such as a trusted entity (e.g. regulator), and entitle a given NO to certain usage. In this case, the RANO needs means to validate an AN license information element or AN license derived information element against the third-party entity 50 (e.g. centralized register, blockchain, etc.). Thereafter, the third-party entity may provide the validation results to the NO 300 which then forwards/provides the AN licenses to the UE 1.

Figure 11:
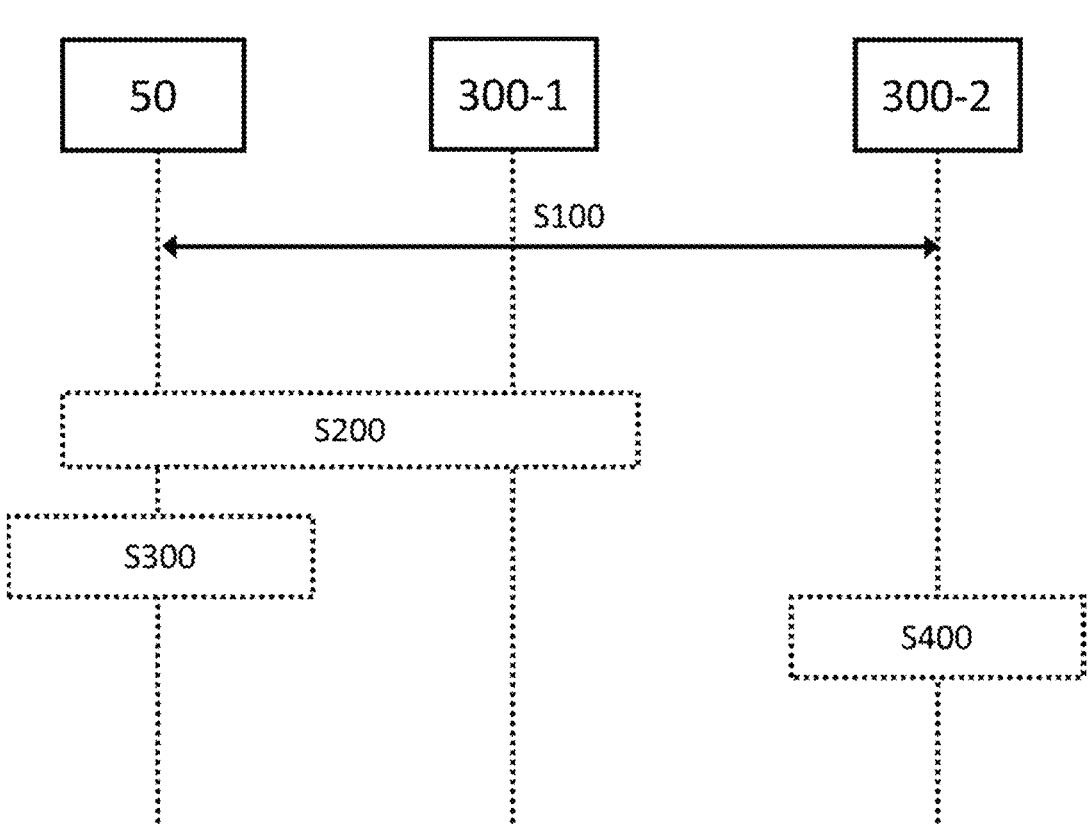
FIG. 11 illustrates an exchange of AN licenses between NOs according to an embodiment of the invention according to an embodiment of the invention.

According to a preferred embodiment, the telecommunications network may further comprise a first NO 300-1 and a second NO 300-2. For example, the first NO 300-1 can have a valid AN license information element 20-A or AN license derived information element stored therein. FIG. 11 illustrates an exchange of AN licenses between NOs according to an embodiment of the invention.

In step S100, the second NO 300-2 validates with the third-party entity 50 whether the AN license information element or AN license derived information element is valid.

If it is valid, in step S200, the ownership of said AN license information element 20-A or AN license derived information element is exchanged to the second NO 300-2, and said ownership change is registered with the third-party entity 50.

In step S300, the third-party entity 50 revokes the validity of the AN license information element 20-A or AN license derived information element of the first NO 300-1.

In step S400, an AN license information element 20-A or AN license derived information element is provisioned to the second NO 300-2 allowing access to the same AN resources 2-A as the AN license information element 20-A or AN license derived information element originally owned by the first NO 300-1.

In a preferred embodiment, the AN license validator entity is a Distributed Ledger (DL) comprising AN resources ownership information stored therein. In this case, the DL may provide to the UE 1, AN 2 and/or CN 3, validated AN resources ownership information upon request.

In a preferred embodiment, the UE 1 may store the one or more AN license information elements 20-A, 20-B or AN license derived information element in a Universal Subscriber Identity Module (USIM) element.

In a preferred embodiment, if the AN license information element or AN license derived information element is not valid and the UE 1 is denied access, the AN 2 or the CN 3 may notify the UE 1 that the access has been denied by the AN 2.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for license-based access network (AN) access control independent of subscriber data in a telecommunications network comprising an AN and a core network (CN), the method comprising:

sending, by a user equipment (UE) to the AN, an AN resource request to use one or more AN resources, wherein the UE comprises one or more AN license information elements and subscriber information associated with a subscriber, wherein the one or more AN license information elements contain information for allowing access to the one or more AN resources independently from the subscriber information, and wherein:

the AN resource request comprises the one or more AN license information elements; or the AN resource request is followed by an exchange between the UE and the AN of one or more AN license derived information elements;

obtaining, by the AN from an AN license validator of the telecommunications network, validity information of the one or more AN license information elements or the one or more AN license derived information elements, the validity information indicating whether at least one AN license information element or at least one AN license derived information element is valid for an AN resource to which the UE is trying to attach; and based on an AN license information element or an AN license derived information element being valid for the AN resource to which the UE is trying to attach, allowing, by the AN, the UE to access the AN resource to which the UE is trying to attach, wherein the AN allows the UE to access the AN resource to which the UE is trying to attach independently from the subscriber information such that the access is allowed based on the valid AN license information element or the valid AN license derived information element and not based on any subscriber information of the UE, and wherein the AN is configured to allow the UE to access specific AN resources of the AN, including specifically accessing all of the following:

one or more cell identities (IDs) of the AN;

a tracking area of the AN;

a public land mobile network (PLMN) identifier of the AN;

a slice identifier of the AN; and specific frequencies of the AN;

wherein the AN is a radio access network (RAN) operated by a RAN operator (RANO);

wherein access to the telecommunications network is provided to the UE by a first network operator (NO);

wherein the subscriber information is owned by the first NO, and the RANO does not have access to the subscriber information.

2. The method of claim 1, wherein the method further comprises:

receiving, by the CN from an AN license provider, the one or more AN license information elements or the one or more AN license derived information elements;

provisioning, by the CN to the UE, the one or more AN license information elements or the one or more AN license derived information elements; and/or revoking, by the CN, one or more AN licenses, wherein the revoking comprises notifying the UE or the AN that the one or more AN license information elements or the one or more AN license derived information elements are not valid anymore and/or indicating to the UE that the one or more AN licenses are to be deleted.

3. The method of claim 1, further comprising:

storing, by the UE, the one or more AN license information elements or the one or more AN license derived information elements in a Universal Subscriber Identity Module (USIM) element.

4. The method of claim 1, wherein the AN resource request is a UE network registration to a specific PLMN.

5. The method of claim 1, wherein the RAN comprises RAN nodes, and the AN resource to which the UE is trying to attach further comprises one or more of the following:

specific locations;

a geographic area; or an expiry timer for indicating a time duration for which the one or more AN license information elements or the one or more AN license derived information elements is valid.

6. The method of claim 1, wherein the AN license validator is located in a third-party entity of the telecommunications network or in the AN.

7. The method of claim 1, wherein the telecommunications network further comprises a second NO;

wherein the first NO has a valid AN license information element or a valid AN license derived information element stored therein; and wherein the method further comprises:

exchanging ownership of the valid AN license information element or the valid AN license derived information element to the second NO by:

registering the ownership change with a third-party entity of the telecommunications network;

revoking, by the third-party entity, the validity of the AN license information element or the AN license derived information element of the first NO; and provisioning an AN license information element or an AN license derived information element to the second NO allowing access to the same AN resources as the AN license information element or the AN license derived information element originally owned by the first NO.

8. The method of claim 1, wherein the AN license validator is a distributed ledger (DL) comprising AN resources ownership information stored therein, and wherein the method further comprises:

providing, by the DL to the UE, AN and/or CN, validated AN resources ownership information upon request.

9. The method of claim 1, further comprising:

based on a respective AN license not being valid and the UE being denied access to a respective AN resource, notifying, by the AN or the CN, the UE that access has been denied by the AN.

10. A method for license-based access network (AN) access control independent of subscriber data in a telecommunications network comprising an AN and a core network (CN), the method comprising:

sending, by a user equipment (UE) to the AN, an AN resource request to use one or more AN resources, wherein the UE comprises subscriber information associated with a subscriber;

sending, by the AN, a request to the CN, wherein the CN comprises one or more AN license information elements, wherein the one or more AN license information elements contain information for allowing access to the one or more AN resources independently from the subscriber information, and wherein the request to the CN is for the CN to:

send, to the AN, the one or more AN license information elements related to the AN resource request of the UE; or initiate an exchange of one or more AN license derived information elements;

obtaining, by the AN from an AN license validator of the telecommunications network, validity information of the one or more AN license information elements or the one or more AN license derived information elements, the validity information indicating whether at least one AN license information element or at least one AN license derived information element is valid for an AN resource to which the UE is trying to attach; and based on an AN license information element or an AN license derived information element being valid for the AN resource to which the UE is trying to attach, allowing, by the AN, the UE to access the AN resource to which the UE is trying to attach, wherein the AN allows the UE to access the AN resource to which the UE is trying to attach independently from the subscriber information such that the access is allowed based on the valid AN license information element or the valid AN license derived information element and not based on any subscriber information of the UE, and wherein the AN is configured to allow the UE to access specific AN resources of the AN, including specifically accessing all of the following:

one or more cell identities (IDs) of the AN;

a tracking area of the AN;

a public land mobile network (PLMN) identifier of the AN;

a slice identifier of the AN; and specific frequencies of the AN;

wherein the AN is a radio access network (RAN) operated by a RAN operator (RANO);

wherein access to the telecommunications network is provided to the UE by a first network operator (NO);

wherein the subscriber information is owned by the first NO, and the RANO does not have access to the subscriber information.

11. The method of claim 10, further comprising:

receiving, by the CN from an AN license provider, the one or more AN license information elements or the one or more AN license derived information elements; and revoking, by the CN, one or more AN licenses, wherein the revoking comprises indicating that the one or more AN license information elements or the one or more AN license derived information elements are not valid anymore and/or deleting the one or more AN licenses.

12. The method of claim 10, wherein the AN resource request is a UE network registration to a specific PLMN.

13. The method of claim 10, wherein the RAN comprises RAN nodes, and the AN resource to which the UE is trying to attach further comprises one or more of the following:

specific locations;

a geographic area; or an expiry timer for indicating a time duration for which the one or more AN license information elements or the one or more AN license derived information elements is valid.

14. The method of claim 10, wherein the telecommunications network further comprises a third-party entity.

15. The method of claim 14, wherein the AN license validator is located in the third-party entity or in the AN.

16. The method of claim 15, wherein the telecommunications network further comprises a second NO;

wherein the first NO has a valid AN license information element or a valid AN license derived information element stored therein; and wherein the method further comprises:

exchanging ownership of the valid AN license information element or the valid AN license derived information element to the second NO by:

registering the ownership change with the third-party entity;

revoking, by the third-party entity, the validity of the AN license information element or the AN license derived information element of the first NO; and provisioning an AN license information element or an AN license derived information element to the second NO allowing access to the same AN resources as the AN license information element or the AN license derived information element originally owned by the first NO.

17. The method of claim 10, wherein the AN license validator is a distributed ledger (DL) comprising AN resources ownership information stored therein, and wherein the method further comprises:

providing, by the DL to the UE, AN and/or CN, validated AN resources ownership information upon request.

18. The method of claim 10, further comprising:

based on a respective AN license not being valid and the UE being denied access to a respective AN resource, notifying, by the AN or the CN, the UE that access has been denied by the AN.

19. A telecommunications network for performing license-based access network (AN) access control independent of subscriber data, the telecommunications network comprising:

a user equipment (UE);

an AN comprising AN resources;

an AN license validator; and a core network (CN);

wherein the UE comprises one or more AN license information elements and subscriber information associated with a subscriber, wherein AN license information elements contain information for allowing access to one or more AN resources independently from subscriber information;

wherein the UE is configured to send, to the AN, an AN resource request to use one or more AN resources, wherein the AN resource request comprises the one or more AN license information elements, or wherein the AN resource request is to be followed by an exchange between the UE and the AN of one or more AN license derived information elements;

wherein the AN is configured to:

obtain, from the AN license validator, validity information of the one or more AN license information elements or the one or more AN license derived information elements, the validity information indicating whether at least one AN license information element or at least one AN license derived information element is valid for an AN resource to which the UE is trying to attach; and based on an AN license information element or an AN license derived information element being valid for the AN resource to which the UE is trying to attach, allow the UE to access the AN resource to which the UE is trying to attach, wherein the AN allows the UE to access the AN resource to which the UE is trying to attach independently from the subscriber information such that the access is allowed based on the valid AN license information element or the valid AN license derived information element and not based on any subscriber information of the UE;

wherein the AN is configured to allow the UE to access specific AN resources of the AN, including specifically accessing all of the following:

one or more cell identities (IDs) of the AN;

a tracking area of the AN;

a public land mobile network (PLMN) identifier of the AN;

a slice identifier of the AN; and specific frequencies of the AN;

wherein the AN is a radio access network (RAN) operated by a RAN operator (RANO);

wherein access to the telecommunications network is provided to the UE by a network operator (NO);

wherein the subscriber information is owned by the NO, and the RANO does not have access to the subscriber information.

20. A telecommunications network for performing license-based access network (AN) access control independent of subscriber data, the telecommunications network comprising:

a user equipment (UE);

an AN comprising AN resources;

an AN license validator; and a core network (CN);

wherein the UE comprises subscriber information associated with a subscriber;

wherein the CN comprises one or more AN license information elements, wherein the one or more AN license information elements contain information for allowing access to one or more AN resources independently from subscriber information;

wherein the UE is configured to send, to the AN, an AN resource request to use the one or more AN resources;

wherein the AN is configured to send a request to the CN to:

send, to the AN, the one or more AN license information elements; or initiate an exchange of one or more AN license derived information elements;

wherein the AN is configured to:

obtain, from the AN license validator, validity information of the one or more AN license information elements or the one or more AN license derived information elements, the validity information indicating whether at least one AN license information element or at least one AN license derived information element is valid for an AN resource to which the UE is trying to attach; and based on an AN license information element or an AN license derived information element being valid for the AN resource to which the UE is trying to attach, allow the UE to access the AN resource to which the UE is trying to attach, wherein the AN allows the UE to access the AN resource to which the UE is trying to attach independently from the subscriber information such that the access is allowed based on the valid AN license information element or the valid AN license derived information element and not based on any subscriber information of the UE;

wherein the AN is configured to allow the UE to access specific AN resources of the AN, including specifically accessing all of the following:

one or more cell identities (IDs) of the AN;

a tracking area of the AN;

a public land mobile network (PLMN) identifier of the AN;

a slice identifier of the AN; and specific frequencies of the AN;

wherein the AN is a radio access network (RAN) operated by a RAN operator (RANO);

wherein access to the telecommunications network is provided to the UE by a network operator (NO);

wherein the subscriber information is owned by the NO, and the RANO does not have access to the subscriber information.

* * * * *